(12) United States Patent
Kremeyer et al.

(10) Patent No.: US 9,268,194 B2
(45) Date of Patent: Feb. 23, 2016

(54) METHOD AND TECHNIQUE TO CONTROL LASER EFFECTS THROUGH TUNING OF PARAMETERS SUCH AS REPETITION RATE

(75) Inventors: Kevin Kremeyer, Kamuela, HI (US); Jeremy Yeak, Tucson, AZ (US); Matthias Lenzner, Tucson, AZ (US)

(73) Assignee: PM & AM Research, Tucson, AZ (US)

( * ) Notice: Subject to any disclaimer, the term of this patent is extended or adjusted under 35 U.S.C. 154(b) by 279 days.

(21) Appl. No.: 13/567,809

(22) Filed: Aug. 6, 2012

(65) Prior Publication Data

US 2014/0231679 A1    Aug. 21, 2014

Related U.S. Application Data

(60) Provisional application No. 61/515,668, filed on Aug. 5, 2011.

(51) Int. Cl.

| | | |
|---|---|---|
| *G21K 1/08* | (2006.01) | |
| *G02F 1/35* | (2006.01) | |
| *H05H 1/00* | (2006.01) | |
| *F41H 13/00* | (2006.01) | |
| *G01S 7/495* | (2006.01) | |
| *H04K 3/00* | (2006.01) | |
| *H05G 2/00* | (2006.01) | |
| *G01S 7/38* | (2006.01) | |
| *F41H 11/02* | (2006.01) | |

(52) U.S. Cl.
CPC .......... *G02F 1/3511* (2013.01); *F41H 13/0056* (2013.01); *H05H 1/0012* (2013.01); *F41H 11/02* (2013.01); *G01S 7/38* (2013.01); *G01S 7/495* (2013.01); *G02F 2001/3528* (2013.01); *H04K 3/60* (2013.01); *H04K 3/825* (2013.01); *H05G 2/008* (2013.01)

(58) Field of Classification Search
CPC ........... H05G 2/008; G01S 7/495; G01S 7/38; F41H 11/02; F41H 13/0056; G01F 1/353; H04K 3/60; H04K 3/825; H05H 1/0012; G02F 1/3511
USPC ................................ 250/493.1, 503.1, 504 R
See application file for complete search history.

(56) References Cited

U.S. PATENT DOCUMENTS

| | | | | |
|---|---|---|---|---|
| 5,726,855 | A * | 3/1998 | Mourou et al. | 361/213 |
| 7,930,967 | B2 * | 4/2011 | Marquis et al. | 89/36.17 |
| 2005/0061908 | A1 * | 3/2005 | Kremeyer | 244/1 N |
| 2005/0224706 | A1 * | 10/2005 | von Rosenberg | 250/234 |
| 2006/0000988 | A1 * | 1/2006 | Stuart et al. | 250/504 R |
| 2007/0040726 | A1 * | 2/2007 | Kremeyer | 342/52 |
| 2007/0068053 | A1 * | 3/2007 | Troitski | 40/442 |

(Continued)

OTHER PUBLICATIONS

Shneider, M.N., et al, "Tailoring the air plasma with a double laser pulse" Physics of Plasmas 18, 063509 (Jun. 2011).*

(Continued)

*Primary Examiner* — Nicole Ippolito
*Assistant Examiner* — Wyatt Stoffa
(74) *Attorney, Agent, or Firm* — Jones Day

(57) ABSTRACT

A technique for controlling the effects generated by the interaction of a plurality of laser pulses with a medium by selecting or varying the successive pulse parameters comprising: generating a plurality of laser pulses interacting with a medium; and selecting or varying the properties/parameters characterizing said laser pulses to control the effects resulting from the interaction among said plurality of laser pulses and said medium.

23 Claims, 2 Drawing Sheets

(56) References Cited

U.S. PATENT DOCUMENTS

| | | | |
|---|---|---|---|
| 2008/0225383 A1* | 9/2008 | Theberge et al. | 359/326 |
| 2008/0277599 A1* | 11/2008 | Soer et al. | 250/492.22 |
| 2009/0032740 A1* | 2/2009 | Smith et al. | 250/503.1 |
| 2009/0074016 A1* | 3/2009 | Mamer et al. | 372/22 |
| 2009/0084252 A1* | 4/2009 | Marquis et al. | 89/1.11 |
| 2009/0184258 A1* | 7/2009 | Ting et al. | 250/461.2 |
| 2010/0090106 A1* | 4/2010 | De Gorordo | 250/305 |
| 2010/0181503 A1* | 7/2010 | Yanagida et al. | 250/504 R |
| 2011/0204265 A1* | 8/2011 | Smith et al. | 250/503.1 |
| 2012/0243564 A1* | 9/2012 | Payeur et al. | 372/21 |
| 2013/0126762 A1* | 5/2013 | Moriya et al. | 250/504 R |

OTHER PUBLICATIONS

Aközbek, N. et al. "White-Light Continuum Generation and Filamentation During the Propagation of Ultra-Short Laser Pulses in Aire," *Optics Communications*, 191 (May 8, 2001) 353-362.

Aközbek, N. et al. "Extending the Supercontinuum Spectrum Down to 200 nm with Few-Cycle Pulses," *New Journal of Physics*, 8:177 (2006) 1-12. Sep 2006.

Arissian, Ladan et al. "The Effect of Propagation in Air on the Filament Spectrum," *Optics Express*, 20:8 (Apr. 9, 2012) 8337-8343.

Chalus, Olivier et al. "Propagation of Non-Diffracting Intense Ultraviolet Beams," *Optics Communications*, 281 (2008) 3356-3360. Dec. 2008.

Chen, Y.H. et al. "Single-Shot, Space- and Time-Resolved Measurement of Rotational Wavepacket Revivals in $H_2$, $D_2$, $N_2$, $O_2$ and $N_2O$," *Optics Express*, 15:18 (Sep. 3, 2007) 11341-11357.

Cheng, Y.H. et al. "The Effect of Long Timescale Gas Dynamics on Femtosecond Filamentation," *Optics Express*, 21:4 (Feb. 25, 2013) 4740-4751.

Chin, See Leang, *Femtosecond Laser Filamentation*, Springer Series on Atomic, Optical and Plasma Physics, vol. 55 (2010) 1-138. Dec 2010.

Clark, T.R. et al. "Time- and Space-Resolved Density Evolution of the Plasma Waveguide," *Physical Review Letters*, 78:12 (Mar. 24, 1997) 2373-2376.

Clark, T.R. et al. "Time-Evolution and Guiding Regimes of the Laser-Produced Plasma Waveguide," *Physics of Plasmas*, 7:5:2192 (May 2000) 2192-2197.

Daigle, J.F. et al. "A Simple Method to Significantly Increase Filaments' Length and Ionization Density," *Appl Phys B*, 94 (2009) 249-257. Oct 2008.

Erkintalo, M. et al. "Rogue-Wave-Like Characteristics in Femtosecond Supercontinuum Generation," *Optics Letters*, 34:16 (Aug. 15, 2009) 2468-2470.

Kosareva, O.G. et al. "Conical Emission from Laser-Plasma Interactions in the Filamentation of Powerful Ultrashort Laser Pulses in Air," *Optics Letters*, 22:17 (Sep. 1, 1997) 1332-1334.

Maioli, P. et al. "Ultraviolet-Visible Conical Emission by Multiple Laser Filaments," *Optics Express*, 17:6 (Mar. 16, 2009) 4726-4731.

Nibbering, E.T.J. et al. "Conical Emission from Self-Guided Femtosecond Pulses in Air," *Optics Letters*, 21:1 (Jan. 1, 1996) 62-65.

Palastro, Jr. et al. "Compression, Spectral Broadening, and Collimation in Multiple, Femtosecond Pulse Filamentation in Atmosphere," *Physical Review A*, 86:033834 (2012) 1-7. Sep 2012.

Papadogiannis, N. A. et al. "Kilohertz Extreme-Ultraviolet Light Source Based on Femtosecond High-Order Harmonic Generation from Noble Gases," *Applied Physics B*, 73 (2001) 687-692. Nov 2001.

Rosenthal, E.W. et al. "Collection of Remote Optical Signals by Air Waveguides," *Optica*, 1:1 (Jul. 2014) 5-9.

Shneider, M.N. et al. "Tailoring the Air Plasma with a Double Laser Pulse," *Physics of Plasmas*, 18:063509 (2011) 1-9. Jun. 2011.

Stelmaszczyk, Kamil et al. "Long-Distance Remote Laser-Induced Breakdown Spectroscopy Using Filamentation in Air," *Applied Physics Letters*, 85:18 (Nov. 1, 2004) 3977-3979.

Tzortzakis, S. et al. "Time-Evolution of the Plasma Channel at the Trail of a Self-Guided IR Femtosecond Laser Pulse in Air," *Optics Communications*, 181 (Jul. 1, 2000) 123-127.

Tzortzakis, S. et al. "Femtosecond Laser-Guided Electric Discharge in Air," *Physical Review E*, 64:057401 (2001) 1-4. Oct. 2001.

Wahlstrand, J.K. et al. "Optical Nonlinearity in Ar and $N_2$ near the Ionization Threshold," *Physical Review Letters*, 107:103901 (Sep. 2, 2011) 1-5. Aug. 30, 2011.

* cited by examiner

METHOD AND TECHNIQUE TO CONTROL LASER EFFECTS THROUGH TUNING OF PARAMETERS SUCH AS REPETITION RATE

CROSS REFERENCE TO RELATED APPLICATION

This application claims the benefit of priority from U.S. Provisional Application No. 61/515,668, filed Aug. 5, 2011. The foregoing related application, in its entirety, is incorporated herein by reference.

Applicants also incorporate herein by reference U.S. application Ser. No. 11/540,964, filed Oct. 6, 2006, now U.S. Pat. No. 8,141,811, and U.S. application Ser. No. 12/289,262, filed Oct. 23, 2008, in their entirety.

SUMMARY OF THE INVENTION

Methods are provided to control signatures and effects of laser pulses interacting with media, including but not limited to: spatial extension of a laser-produced plasma; plasma lifetime; the spectral content of the emission from the combination of the laser pulses, plasma, and the resulting filament(s); and other effects such as ablation, machining, and material treatment. A powerful laser pulse is capable of generating plasma and filaments when propagated through a medium, either as free propagation through said medium or aided by focusing effects and/or optics. Laser filaments may emit much broader spectra than single pulses or than the filament created by the initial pulse, without prior interaction with or preparation of the medium, in the form of said propagation and potential focusing. However, beyond this, the interaction of each pulse may an effect on the medium which may be characterized by a certain evolution in time, and oftentimes a temporal duration, most notable in fluid systems, such as gases or liquids, as well as in the plasma state. As a result, pulses in succession may encounter an evolving medium, the state of which is determined by the preceding train of pulses, including the temporal delay from one pulse to the next. From this, follows the fact that by changing the temporal delay between pulses (which when successive pulses are evenly spaced is the laser repetition rate), characterizing a train of pulses through a medium, the resulting physical dynamics/characteristics/effects/signatures of a pulse train may be changed/controlled, including but not limited to the length (both spatially and temporally) of the filaments and associated plasma, as well as their electrical and optical characteristics/signatures, including but not limited to electrical conductivity, spatial (transverse) and/or temporal spreading/shaping of the pulse, polarization, pulse wavefront and spectral content of its emissions in all directions. Tuning through timescales pertaining to condensed states, such as liquids and solids may further allow control of processes beyond filamentation specific to these materials, including but not limited to machining, ablation, chemical reaction and other treatment (for example, including but not limited to imposition of stress and/or strain states, polymerization, desorption, cleaning, etc). Tuning through timescales of the plasma and its interaction with the electromagnetic field of the laser pulses, may also allow better optimized control of the new wavelengths generated, including but not limited to broadband THz [12], infrared, near infrared, far infrared, and microwave pulses.

Methods presented herein generally relate to the controlled generation of laser pulses, filaments and plasma, including their physical characteristics and signatures, including but not limited to electrical, spatial, temporal, and optical, and more generally their interaction with media and materials and the resulting effects. In one embodiment, these methods may provide a means to extend the length of laser filaments and plasma. Another embodiment applies said methods to control the spectral bandwidth of the optical/spectral emission of the laser filament/plasma, as well as the wavefront of the laser pulses. Further embodiments may allow for material effects in condensed phases to be controlled through control of pulse parameters, including but not limited to repetition rate of two or more laser pulses, as well as the timing and intensity pattern occurring within a train of two or more laser pulses. For example, one or more initial pulses may require higher energy and/or intensity to achieve a desired initial effect, which may be sustained or exploited by successive pulses with less energy and/or intensity. A pulse train may be tailored to achieve desired physical effects through interacting with a medium and/or target material by varying the individual pulse parameters within the train, as well as the timing between said pulses, if desired. The general flexibility disclosed here includes optimization of any sequence of pulses, including overlapping pulses, including optimized pulse bursts occurring at a regular repetition rate, with a specific case being to simply adjust a repetition rate, in which we adjust the timing between reasonably uniform laser pulses, instead of an optimized pulse burst (multiple pulses at a regular repetition rate, instead of single pulses). Besides a specific pulse burst, additional components may be superimposed over a given tailored pulse burst (including over single pulses), such as additional pulses with different characteristics (such as pulse width, wavelength, etc), harmonics of the pulses upon which their own harmonics are being superimposed, and/or long pulses, including effectively continuous radiation (effectively and including CW laser radiation). One benefit of using a pulse burst is that the pulse separation between the pulses in the pulse burst may not allow an acceptably large pulse energy per pulse in the pulse burst, while still operating at a reasonably attainable average laser power, if those pulses are continually generated. As a result, one may instead determine the pulse separation and modulation required to optimize the desired interaction, use this information to optimize the general shape/format of a pulse burst, allocate a reasonable energy per pulse burst to further define the pulse burst, and then determine the repetition rate at which this pulse burst may be repeated, while still operating at a reasonably achievable average power of the laser.

BACKGROUND OF THE INVENTION

A laser or optical filament may be formed when a laser pulse with sufficiently high power undergoes self-focusing and consequently generates a plasma by ionizing the molecules of air (or by ionizing the molecules of a condensed state, through which it is propagating). A dynamic balance between diffraction, self-focusing and plasma defocusing ensures that the laser filament with its characteristically small beam size propagates over many Rayleigh lengths. For optical wavelengths in air at terrestrial densities, these filaments often require pulsewidths in the femtosecond to picosecond regime, whereas for shorter wavelengths, such as ultraviolet wavelengths, these filaments may be achieved with yet longer pulses, up to the nanosecond regime [see O. Chalus, A. Sukhinin, A. Aceves, J.-C. Diels, "Propagation of non-diffracting intense ultraviolet beams," Optics Communications, Vol. 281, No. 12, pp. 3356-3360 (2008)]. Higher or lower air densities may change some of the self-focusing and propagation characteristics, but may support the same effects. Different gases and gas mixtures may also support the desired effects. A characteristic of a subset of these laser filaments, as well as the laser-plasma interaction w/solid materials and gases other than air, is their ability to generate a supercontinuum, or "white light". This supercontinuum generation has been attributed to self-phase modulation, X-wave formation and four-wave mixing [see F. Theberge, M. Chateauneuf, V. Ross, P. Matthieu, J. Dubois, "Ultrabroadband conical emission generated from the ultraviolet up to the far-infrared during the optical filamentation in air," Optics Letters, Vol. 33, No. 21, pp. 2515-2517 (2008)]. Spatial and temporal focusing techniques have been numerically explored for individual filaments in [see M. Kolesik, D. E. Roskey, J. V. Moloney, "Conditional femtosecond pulse collapse for white-light and plasma delivery to a controlled distance," Optics Letters, Vol. 32, No. 18, pp. 2753-2755 (2007)], in order to explore control of the supercontinuum generation that accompanies a laser filament. Temporal focusing, by adjusting the chirp of a single broadband laser pulse, has been demonstrated in [see G. Mechain, C. D'Amico, Y.-B. Andre, S. Tzortzakis, M. Franco, B. Prade, A. Mysyrowicz, A. Couairon, E. Salmon, R. Sauerbrey, "Range of plasma filaments created in air by a multi-terawatt femtosecond laser," Optics Communications, Vol. 247, pp. 171-180 (2005)] to achieve optimal ionization at long distances. Spectral reshaping of ultrashort pulses via filamentation in a gas cell or a waveguide at different pressures has also been investigated [see C. P. Hauri et al., "Generation of intense, carrier-envelope phase-locked few-cycle laser pulses through filamentation," Applied Physics B, Vol. 79, pp. 673-677 (2004); and A. Couairon et al., "Pulse self-compression to the single-cycle limit by filamentation in a gas with a pressure gradient," Optics Letters, Vol. 30, No. 19, pp. 2657-2659 (2005); and L. T. Vuong et al., "Spectral reshaping and pulse compression via sequential filamentation in gases," Optics Express, Vol. 16, No. 1, pp. 390-401 (2008)] to reduce the pulse width and thereby increase the spectral content of the pulses. Coherent control of terahertz supercontinuum generation in ultrafast laser-gas interactions was investigated [see K. Y. Kim et al., "Coherent control of terahertz supercontinuum generation in ultrafast laser-gas interactions", Nature Photonics No. 2, pp. 605-609 (2008); and Z. Wang, "Generation of Terahertz via Nonlinear Optical Methods", IEEE Transactions on Geoscience and Remote Sensing, vol. 1, no. 1 (2010)] in which terahertz generation in, semiconductors and nonlinear crystals, gases, super-broadband terahertz radiation (approx 75 THz), as well as an enhanced accompanying third harmonic generation were all explored. Using the methods disclosed here, all of these effects may be optimized through tailoring of the plurality of pulses generating them, including but not limited to the repetition rate, when the pulses are regularly space in time and may be characterized in terms of a repetition rate. X-rays have also been generated in the past, using laser pulses, in a variety of solid, liquid, gas and plasma/ionized media, including but not limited to in gases, rare gases, air, and water, as well as on solid targets and solid surfaces, including but not limited to semiconductors, metals and alloys, including metals and alloys containing elements of atomic number Z=11-45 and also including heavy metals and high-Z materials, including metals and alloys containing elements of atomic number Z>45.

In considering the concept of filament length, there are two aspects to consider. The first is the actual distance over which gas is ionized, representing the total ionized length, regardless of temporal dynamics, such that a time-integrated photograph would show this total ionized length. The second aspect is having a contiguous region, ionized simultaneously, such that an instantaneous photograph would capture the instantaneous ionized length. In the literature, there are several ways to extend the length of a laser filament.

These may include but are not limited to:

1. Increasing the laser energy and power—By increasing the energy of sub-100 fs pulses to over 100 mJ, propagation distances over 20 meters have been observed with multiple filaments. However, the break-up of the initial laser beam into multiple filaments occurs due to modulational instabilities. The formation of multiple filaments along the propagation direction of the laser pulse restricts the individual laser filament length to about 1 meter, although these filaments may be regenerated through dynamic spatial replenishment from the energy reservoir that surrounds them [see K. Stelmaszcyzk et al., "Long-distance remote laser-induced breakdown spectroscopy using filamentation in air," Applied Physics Letters, Vol. 85, No. 18, pp. 3977-3979 (2004)].

2. Controlling the laser beam focusing—To avoid small-scale filamentation that is often associated with modulational instabilities, the initial laser beam may be weakly focused to generate a laser filament. This method provides a robust way to control the density, size and length of the plasma generated by the laser pulse. The use of an axicon lens has also been reported [see S. Akturk et al., "Generation of long plasma channels in air by focusing ultrashort laser pulses," Optics Communications, Vol 282, pp. 129-134 (2008)] to generate long plasma channels. The temporal lifetime of this filament again depends on the plasma lifetime after the laser pulse interacts with the medium.

3. Concatenation of twin laser pulses—It has been shown [see S. Tzortzakis et al., "Concatenation of plasma filaments created in air by femtosecond laser infrared laser pulses," Applied Physics B, Vol. 76, pp. 609-612 (2003)] that two sub-pulses with orthogonal polarization and separated by 100 fs may be concatenated to form a longer laser plasma in air. Given that the plasma lifetime is typically much longer than 100 fs, the temporal lifetime of this filament again depends on the plasma lifetime after the laser pulse interacts with the medium, which appears to be extended by the additional "orthogonal" excitation of the second pulse.

4. Using shorter wavelengths and longer pulse widths—When using shorter wavelengths, different mechanisms may be exploited by the laser pulse to ionize the air, increasingly incorporating multi-photon ionization as wavelength is decreased. In particular, ultraviolet pulses have been postulated to exploit this mechanism to result in much longer filaments, in that a single laser pulse may maintain a sufficient intensity to ionize gas without defocusing, thereby forming a longer filament in the sense of a longer spatial extent of time-integrated ionized gas, although temporally the actual length of a simultaneously contiguous plasma is still governed by the plasma lifetime, which is dictated by the ionization and recombination dynamics resulting from passage of each single pulse [see O. Chalus et al., "Propagation of non-diffracting intense ultraviolet beams," Optics Communications, Vol. 281, No. 12, pp. 3356-3360 (2008)].

5. Extension of the plasma lifetime and/or revival of the plasma—To extend the lifetime of the electron plasma generated by a laser filament, a combination of femtosecond and nanosecond laser pulses has been adopted [see B. Zhou et al., "Revival of femtosecond laser plasma filaments in air by nanosecond laser," Optics Express, Vol. 17, No. 14, pp. 11450-11456, (2009)]. In this technique, the short lived plasma channels generated in the wake of femtosecond laser pulses through filamentation in air may be revived after several milliseconds by a delayed nanosecond pulse, which is normally unable to ionize the air, without said air having first been ionized by the preceding more intense laser pulse.

DETAILED DESCRIPTION OF THE DRAWINGS

DETAILED DESCRIPTION

Figure 1:
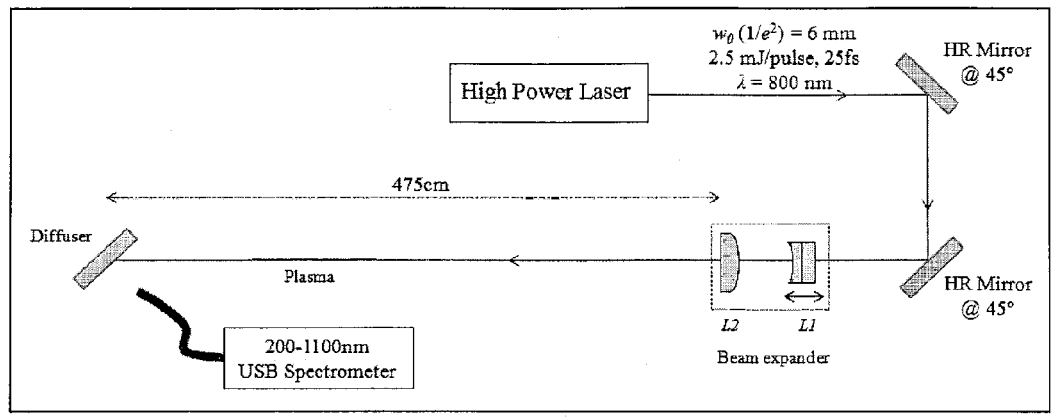
FIG. 1 shows the experimental setup to measure supercontinuum from a filament.

At least one embodiment of the methods of the invention may provide a variety of different effects, including but not limited to longer laser filaments and plasmas that emit a larger spectral bandwidth for a given laser pulse energy, initial chirp and focusing geometry. These methods may also be utilized to control the wavefront of the laser pulses transmitting/propagating through various media.

High intensity laser pulses interact with the medium through which they propagate, through a variety of mechanisms. These mechanisms may include, but are not limited to molecular dissociation, molecular and atomic ionization, electron/ion acceleration, bulk polarizability, and dipole rotation, among others. These interaction mechanisms may lead to such material effects, including but not limited to ionization, chemical reaction, medium heating, medium expansion, medium damage, among others. Each of these interaction mechanisms and material effects may change the electrical and optical properties of the medium; and this change in medium and potential recovery to the original or some new state, has a characteristic time associated with it. When considering successive laser pulses through a medium, with the same amount of time separating each successive pulse, if the time between pulses is sufficient to allow the medium to relax back to its original condition before it is encountered by each successive pulse, then the observed effects and signatures of the laser pulse interacting with the medium may be effectively the same as those of a single, individual pulse. However, if a laser pulse propagates through a medium that is materially altered by the previous laser pulse, the interaction effects/signatures of the laser pulse through said materially altered medium may be materially different from the interaction effects/signatures observed when a single laser pulse interacts with said medium. In at least one embodiment of the invention, the repetition rate involves the one with which the laser pulses interact with the same medium, which is evolving after interaction with the preceding pulse. A distinction may be made for cases in which the medium and point of laser interaction are moving with respect to one another, which may occur in, but is not limited to, such scenarios where the laser interaction regime is being scanned across or through the medium, as well as in which the medium is moving with respect to the laser interaction regime (and combinations of these two). In such cases, at least one embodiment of the effects and invention we describe here may still occur, however the repetition rate must be modified to accommodate the speed of relative motion and the size of the interaction regime, including the spatial extent and evolution speeds and timescales of the mechanisms of interest in the evolving medium. In addition to actually moving with respect to the laser-interaction regime, the medium may also be effectively moving with respect to the interaction regime when the laser platform is moving with respect to said medium, as well as when the laser focus is being scanned, and combinations of these two scenarios.

One second is a relatively long time for standard atmospheric gases to remain excited electronically, chemically, and/or mechanically, although some material effects may last for much longer than this time period in higher density/higher viscosity media, including but not limited to chemical by-products, metastable states, material change and/or damage, among others. In a standard atmospheric gas and for small regions of energy-deposition such as 10's/100's of micrometers to millimeters, the mechanical relaxation times occur on timescales of tens to hundreds of microseconds, to tens to hundreds of milliseconds, depending on the spatial scale and degree of equilibration being considered. This mechanical relaxation may be comprised of such dynamics as shock wave generation/propagation/expansion, gas flow, buoyancy, and thermal mixing/equilibration, among others (true diffusional thermal equilibration may require longer yet). In a condensed medium, the mechanical changes and relaxation further include but are not limited to phase changes, e.g. from liquid to gas or from solid to liquid and/or gas, among others, which may require much longer timescales yet. At the yet shorter timescales of nano-seconds to hundreds of nano-seconds, the electronic relaxation (e.g. electron recombination) occurs in low-density gases. In general, between these two timescales, atomic and molecular relaxation takes place (e.g. recombination of atomic/molecular species/ions and ringing down of vibrational modes). As a result, depending on the strength of the effect on the signature(s) in question, we may expect notable changes in said signature(s), as we tune the temporal separation between pulses (i.e. as we tune the laser pulse repetition rate for pulses which are evenly spaced in time) across a regime of greatest change/relaxation, of significance to said signature. This may happen for example, as we tune through roughly a kHz, corresponding to the mechanical relaxation time of the low-density tube created in air by the energy deposited by a laser filament. Such a change in signature could also happen as we tune through the MHz to GHz regime, corresponding to the electron recombination of the plasma generated by the laser pulse. These are only two possible and notional examples out of many (depending on laser pulse parameters and the medium in question). In at least one embodiment of the invention, more complex relationships may be considered, for example, when machining a material, the ionization/plasma created by a pulse may serve to reflect a pulse that follows before the plasma has recombined, however it may also serve to better couple weaker pulses that would otherwise not ablate the material in the absence of ionization/plasma to enhance the coupling. As a result, when tuning through the timescales of plasma-recombination (MHz-GHz) during the machining of a material with roughly constant pulse parameters far exceeding the ablation threshold, one may expect a reduction in energy effectiveness or coupling into material removal (as more energy is reflected off the increasingly ionized plasma). However, given the presence of the plasma for each succeeding pulse, the pulse energy may be reduced below the intensities required to remove material by a single pulse, thereby allowing a reduction in pulse energy (intensity) at these otherwise less efficient high repetition rates (for which the succeeding pulses encounter plasma). In this way, these otherwise less efficient high repetition rates (when the pulse parameters remain unchanged) may allow lower-energy/lower-intensity pulses to perform tasks (e.g. machining, ablation, material modification/treatment), when said lower-energy/lower-intensity pulses are otherwise too low to achieve said effect. Operationally, this may be achieved by identifying a repetition rate at which energy is less efficiently coupled to the material or desired material process than at lower repetition rates. After performing the process (machining/ablation/treatment) at said identified repetition rate for some number of pulses, using the pulse parameters that make said process feasible for a single pulse, one may then reduce the pulse-energy/pulse-intensity to levels that are too low to perform said process using single pulses. This may1 allow the performance of a process at lower energies and intensities than needed for single pulse operation, by tuning the repetition rate of the laser pulses to identify a specific interaction timescale (e.g. electron-recombination) and then adjusting other laser parameters (e.g. pulse energy or pulse intensity) to perform said process with yet lower energy requirements. This may achieve benefits in any number of areas, including but not limited to reduced ancillary effects or damage, and increased coupling efficiency of energy into the process in question. In the case of materials, considered to be opaque, there is still an interaction regime at the surface and penetrating into the material to some extent. For these faster processes, the time between pulses may become sufficiently short, that they cannot be repeated arbitrarily often, since it would require an unreasonable amount of average power from a laser. In these cases, the "repetition rate", we refer to would be that between the individual pulses in a pulse burst, and this pulse burst would be optimized to yield the most desirable outcome, with the individual pulses of the pulse burst being tailored using not only pulse width and spacing (time duration of and between pulses, respectively), but also the other parameters, including but not limited to intensity, polarization, frequency, and harmonics, with the possibility of additional pulses of different parameters being overlaid/overlapping with one another. This optimization of effect, evolution, and propagation are covered by at least one embodiment of this invention and description.

As an example, by varying the repetition rate of the filamenting laser beam, both the spectral bandwidth and length of the laser filament and plasma may be controlled. The temporal spacing between pulses may vary, and uniform pulse parameters are not required from one pulse to the next. Some simple example means for varying an example uniform repetition rate of relatively uniform filamenting laser pulses include but are not limited to:

a) Changing the repetition rate of the pump laser—The repetition rate of the filamenting laser is primarily determined by the pump laser for laser amplification. The pump laser may be a diode-pumped or a flashlamp-pumped laser. By adjusting the repetition rate or operating frequency of the pump laser, the output laser repetition rate is varied accordingly;

b) Modulating the output of the filamenting laser with an optical modulator—Alternatively, the repetition rate of a filamenting laser may also be adjusted by dividing the repetition rate of the laser output by an integer number using an optical modulator. This modulator may be a mechanical, an electro-optic or an acousto-optic switch. For an example of an electro-optic switch, a Pockels cell is used in conjunction with a polarizing beamsplitter; and c) Beating pulses against one another to achieve a type of interferometric modulation, to allow yet higher "repetition rates", with correspondingly shorter times between pulses.

These same approaches may be used to modulate the pulses to achieve any of the effects disclosed herein, in fact these two approaches may be mixed together, to allow for greater flexibility. As an example, without being limiting, if a seed laser is operating at one frequency, for example somewhere between 10 MHz-3 GHz, the time between its pulses is between 100 ns-333 ps, respectively. Let us then consider a pump laser for an amplifier stage that operates at another repetition rate somewhere between the range of 10 Hz-100 kHz, resulting in a spacing between amplifier pulses between 0.1 s-0.01 msec, respectively. If the amplifier pulse may amplify a signal over roughly one microsecond, this may allow a number of pulses from the seed laser to be amplified during one pulse of the amplifier laser. The seed laser pulses may be modulated in a way that may tailor the output pulse burst to the desired optimized pulse. This modulation may be achieved through a large number of mechanisms, such as those listed above, including but not limited to one or more Pockel's cells. As further example without being limiting, this pulse burst may be tailored to exit the laser system (after having been fully amplified through all of the amplifier stages) with one or more "ignitor pulse(s)" to introduce a sufficient amount of initial or threshold energy, followed by one or more "sustaining pulse(s)", which have less energy than the ignitor pulses, although sufficient to continue the desired initiated effect. As described above, the energy profile of these pulses may be arbitrarily complex, including modulation of other parameters, besides energy, including additional overlapping pulses, possibly from but not limited to additional properly-timed laser sources or from pulses split from the original pulses. This pulse burst would then be emitted from the overall device at the repetition rate of the pump laser, thereby, allowing an attainable average power, while employing the desired repetition rate or pulse spacing between the optimized pulses within the pulse burst.

As an example application, while also not being limiting, by simply increasing the repetition rate of a filamenting laser (in air), not using a pulse burst modulation of a seed laser, the resulting spectral bandwidth may be extended towards shorter and longer wavelengths, beyond the initial pulse bandwidth. The extension of the spectral bandwidth is accompanied by an increase in length of the laser filament. This increase in both the spectral bandwidth and length of the laser filament and plasma increases relatively sharply when the repetition rate of the laser increases above a certain threshold value. In this example, and given our limited resolution in terms of repetition rate, said threshold value may be roughly characterized as higher than 1 kHz for the laser and air conditions that day.

At least one of the above embodiments of the present invention provides a simple approach to the generation of larger spectral bandwidth and longer laser filaments and plasma by increasing/tuning the repetition rate of the output laser, while keeping the pulse energy, initial chirp and focusing geometry fixed. Using this approach, longer filaments and/or broader spectral ranges may be generated that may be useful for a variety of applications, including but not limited to laser wavefront control and remote sensing, such as light and ranging (LIDAR) applications. The broad spectrum may also be directed toward a sensor to saturate it over a broad range of wavelengths or to fill it with sufficient flux over a desired spectral range to obscure specific signatures in said range, and/or generate temporary or permanent incapacitation of the sensor. Given the generation of broader bandwidth, this technique may potentially also be useful to generate laser pulses shorter than the initial laser pulses, for example the generation of tunable few-cycle pulses. The technology described herein may also be used to control the electrical properties of the medium, including but not limited to the electrical insulating and/or conducting properties, for example to generate a longer conductive channel and/or laser-produced plasma, which may in particular be used in laser-guided electrical discharges and/or laser-guided lightning. In the potential applications, any combination of pulses may be used to optimize a process or effect and then repeated, in particular, without being limiting, if the emitted spectrum or conductivity of an air filament were to require very strong pulses, of roughly 30-300 mJ/pulse, with an optimal repetition frequency of 3 kHz, this could be achieved by employing pulse-bursts containing 10 pulses with 300-3000 mJ for each pulse-burst, and these pulse bursts could then be repeated in an affordable fashion for the given laser system in the field, for example, but not limited to pulse-bursts of ten 30 mJ pulses separated by 0.333 ms, with each pulse burst emanating from the laser at ⅙ kHz, leading to a 50 Watt average power laser system. Using 5-pulse pulse-bursts emanating at 1 kHz would lead to a 150 Watt average power system, and the spacing between bursts could be tailored for further optimization without impacting the average system power, whereas the actual energy modulation of the pulses within the pulse-burst could be optimized to use less energy per pulse, therefore less energy per pulse-burst, and therefore less average power.

Another embodiment of the invention, may include a laser system, and a method of producing broad spectrum radiation, that may include one or more lasers (for example 2-lasers, 3-lasers or 4-lasers) that provides the ability to vary at least one or more or all the parameters discussed herein to produce broad spectrum radiation. The system may also include steering optics (and/or adaptive optics to compensate for environmental conditions and environmental aberrations) to fine tune (including, for example, continuously fine tune) the x-y direction and z-direction for where the filament (or filaments) initiate, and their trajectory, the generation of the broad spectrum radiation (or white light). The system may include controllers to continuously re-direct and/or refocus the point or points of formation of the filaments and may be controlled to track and/or lock onto a target (for example an airborne target with a tracking sensor or seeker head or imaging array). The system may be controlled such that is defeats, interrupts and/or cripples the tracking sensor of the target.

In at least one further embodiment of the invention, one or more of the methods presented above may be applied where pulsed lasers are currently employed. In an embodiment for generating laser filaments, using ultrashort pulse lasers, the filaments may be applied in areas including, but not limited to depositing energy into the air in order to modify flow, thereby steering/guiding a vehicle, as well as reducing its drag. Remotely modifying a surface and/or disrupting the flow around an air vehicle can further allow steering of the vehicle or disruption of its operation, which can be used to divert and/or disable air platforms. In addition to controlling air density and modifying (heating and/or machining/embrittling/roughening) lifting/control surfaces, this flow disruption may also take place at inlets and other portions of the propulsion train, which can further afford control and/or disruption of an air platform.

In other embodiments, the filaments may also be used to guide energy of different forms, including but not limited to electric discharges, microwave energy, laser energy, THz energy, among others, which can help place more energy on a desired area or target for a variety of reasons, including but not limited to communication, remote sensing, interrogating said area or target, processing the target, as disclosed herein (including, but not limited to machining, ablating, peening, cleaning, introducing stresses and/or strains, chemically changing/modifying/reacting said area or target or surface or bulk medium), and any plasma and/or ionization generated by the laser pulses can serve to modify the coupling of energy into areas of interest and/or targets/target-materials, including enhancing or reducing the coupling, depending on the generated plasma/ionization properties and the nature of the energy to be coupled, including amount of energy, intensity, and wavelength or frequency, if applicable. In addition to heating the air/gas, the laser energy and coupled energy may also deposit into a surface or target, causing a number of effects, including but not limited to damage/incapacitation, as well as identification/characterization. The light that emanates from a filament and/or laser-plasma interacting with the electromagnetic radiation and gas and/or air may furthermore be used to probe/illuminate targets of interest, including but not limited to purposes of characterizing a volume, target material, and/or surface to determine such information as but not limited to content, composition, speed, state, etc, which can be used for such purposes as but not limited to situational awareness, characterizing a scene/environment, and/or monitoring. The generated light may further be used as a method to avoid detection, location, and/or identification, as in an application where a sensor, detector, or imaging array is attempting to achieve detection, location, and/or identification of an object and/or entity said object and/or entity can direct the light generated by the filament and/or laser-plasma (interacting with the air/gas and electromagnetic radiation) to avoid said detection, identification, and/or location by either saturating the detector, sensor, and/or imaging array in one or more spectral bands, in which it can be detected, identified, and/or located, or it can obscure its own signature(s) in a stronger noise level to mask its own signature(s), or it can temporarily or permanently incapacitate the detector, sensor, and/or imaging array in one or more spectral band(s). One application in particular, without being limited, is the ability to blind, saturate, spoof, or incapacitate a detector, sensor, or imaging array located on a platform such as a reconnaissance platform (including but not limited to space satellites, human-guided or unmanned vehicles, ground vehicles, water vehicles (surface and underwater), air vehicles, and space-borne assets and/or an incoming threat and/or threat platform, including but not limited to missiles, torpedoes, human-guided or unmanned vehicles, ground vehicles, water vehicles (surface and underwater), air vehicles, and space-borne assets.

In another embodiment of the invention, X-rays, microwaves and THz may also be employed in a number of applications, including but not limited to imaging through materials/media that are opaque to the visual spectrum, or in situations where there is no light or no ability to view the light. These applications may help diagnose, understand, monitor, otherwise hidden mechanism, including on very fast timescales, given the short duration of the pulses. This may be very helpful in diagnosing the operation of equipment or fast dynamic processes, including motors, engines, detonations, and impact/penetration events. They may also be used to find hidden materials, including but not limited to smuggled, dangerous, lost, or illegal materials, including but not limited to weapons, explosives, drugs, contraband, humans. The generated X-ray, microwave and/or THz pulses may also be used for communication, including with the source of the X-ray, microwave, and/or THz pulses being generated remotely by the optimized laser pulses. The optimized plurality of pulses to achieve optimal pulse compression, results in much shorter laser pulses (e.g. sub-femtosecond pulses), which allow for yet more flexibility in tailoring pulses when optimizing processes involving very short timescales, such as X-ray generation. When propagating the laser pulses through a medium, the ability to control the wavefront is important, and controlling said wavefront through its interaction with the medium, through control of the energy deposited in the air to sculpt the density profile is a means to control both the wavefront and impose a form of remote adaptive optics.

In a further embodiment of the invention, optimized pulses for given material interactions, also enable, cleaning of surfaces, surface treatments, and materials identification and cleaning processes, allowing the writing of features on surfaces, or in bulk media, or in liquids, for example, through polymerization of a liquid monomer. This may lead to the creation of waveguides in the materials, as well as microfluidic channels or communication channels, as well as simply the general cleaning and writing of features. In treating semiconductors, it may be preferred to to use only the bare minimum energy, in order to minimize the number of defects generated by the process.

Potential applications of the at least one embodiment of the invention may include but are not limited to: lidar and/or ladar; environmental monitoring; remote sensing; wavefront control and adaptive optics; saturating and/or temporarily or permanently incapacitating sensors and/or arrays, overwhelming certain spectral bands in order to obscure certain signatures of interest; saturating a sensor and/or imaging array and/or overwhelming/obscuring signatures of interest over a functional spectral range (or functional detection range) of a sensor and/or imaging array, in which a functional detection range is a range over which useful signatures may be detected in order to accomplish the intended task of the sensor and/or imaging array (basically if obscuring signatures over a certain spectral range may defeat one or more of the utilities of a sensor and/or imaging array, this spectral range may be considered a functional spectral range or functional detection range of potentially multiple functional detection ranges of the sensor and/or imaging array); laser pulse compression, including but not limited to in rarefied gas; guiding microwaves; guiding lightning; guiding electric discharges; THz generation including but not limited to in gas, air, and condensed matter, such as liquids and solids, including but not limited to semiconductors, such as Silicon and GaAs structures, non-linear dielectric crystals, and non-centrosymmetric crystals, including but not limited to perovskite Perovskite structures, also including but not limited to Lithium Niobate and Barium Titanate, among others; X-ray generation including but not limited to in rare gases, noble gases, and inert gases, and on metal surfaces and on/in semiconductors; aerodynamic flow-control; drag reduction; writing waveguides in materials, including but not limited to in optical materials and easily phase-transformed materials; cleaning surfaces including but not limited to integrated circuits, masks, semiconductor materials, metals and alloys, artwork, ceramics, gemstones, optical materials; peening surfaces, including but not limited to metals, alloys, ceramics; introducing stresses to surfaces, including but not limited to metals, alloys, ceramics; chemically treating surfaces, including but not limited to metals, alloys, ceramics, plastics, artwork, gemstones; marking surfaces including but not limited to metals, alloys, ceramics, plastics, artwork, gemstones; polymerizing paths in unpolymerized fluid media; writing three dimensional structures in materials including but not limited to glass, plastic, optical materials/fibers, through processes including but not limited to ablation, stress introduction, chemical modification, and phase change, among others.

These potential applications, involving a broad range of physical mechanisms, are achieved by adjusting the parameters characterizing a plurality of pulses, including pulses that are irregularly separated in time, including pulses that overlap one another in time. For the simple case of pulses that are regularly spaced in time, we envision enabling the applications by tuning the pulse repetition rate generally over the broad range of 0.1 Hz-10,000 GHz. This range is narrowed down to specific sub-ranges depending on the dominant mechanism(s) governing the effect(s) to be controlled, such as 500 Hz-10 kHz, for example when considering processes involving expansion of a gas after deposition of millijoules of energy along an extended path at generally accessible pressures. This range of applicable notable/notional repetition rates will be broadened to ranges including but not limited to 0.1 Hz-50 kHz, and 0.1 Hz-2 kHz under different atmospheric conditions and/or when depositing more or less energy into the air. These same ranges apply to effects governed by electron-detachment from metastable atomic and/or molecular ions over broad atmospheric conditions. For effects governed by electron- and/or plasma-recombination in relatively dense gases, repetition rates of 1 MHz-1 GHz may be effective. For other effects, including THz and X-Ray generation, repetition rates of 10 MHz-10,000 GHz may be effective. For irregularly spaced pulses, sequences of pulse-bursts with the above timing and corresponding pulse separations or overlapping pulses may be implemented to more efficiently achieve these same goals and also using much lower average power.

As mentioned, the pulse parameters may also be varied in the succession of pulses, beyond simply tailoring a repetition rate of evenly spaced pulses to achieve the desired results. One such embodiment is to reduce the pulse energy, once a physical process has been started using sufficiently high pulse energies, and which may then be sustained by lower pulse energies/intensities. The central laser wavelength(s) we may employ are fully flexible, including but not limited to the range of 220 nm-11,000 nm, noting specific possible amplifier media, without imposing limitation, of Ti:Sapphire, Excimer, Cr-, Ho-, Tm-, Nd-, Yb-, Er-based systems in glass, ceramic, and crystal, such as YAG, YLF, LiSAF, LiSGaF, LiCAF, Forsterite, fibers, ZBLAN, and gas lasers such as Cu-vapor, N2, CO2 systems, as well as harmonics of all of these systems. One possible application of using more than one laser when assembling the plurality of pulses is the ability to overlap pulses in time, with different parameters, in order to generate desired effects. As described herein and in the references, the desired effects may come from overlapping pulses of different polarization states or different wavelengths, among all of the other possible variations in parameters. If the overlapping pulses with different parameters are to be in phase (e.g. one is a harmonic of the other, or one has rotated polarization), one method to generate them is to split a single pulse and then adjust the parameters of the individual pulses thereafter. After being split, these pulses either may or may not be amplified, which may take place along the same or different amplification paths. If the laser pulses do not need to be in phase, whether or not they overlap temporally, one may generate said pulses using completely distinct lasers at the same or different repetition rates, with the multiple lasers either synchronized with one another or not. In addition to design flexibility, if the laser pulses generated by one or more lasers are to have differing central wavelengths, then the lasers may be selected, such that they generate the different desired central wavelengths. In the case of trying to cover a large range of the electromagnetic spectrum such that the sum/span of the broadened spectra of the laser pulses interacting with the medium covers the desired range of a targeted sensor or imaging array, the lasers that may generate the plurality of pulses may be selected based on their central frequency and the broadening they may experience when interacting with the medium, given the selected combination of pulse parameters. In the case of multiple lasers, the repetition rate of each individual laser may only be a fraction of the combined repetition rate experienced by the medium and its interaction with the full set of pulses. As a result, the repetition rates and ranges of repetition rates cited herein may be adjusted, based on the actual repetition rate experienced by the medium. For example, if three different lasers, with central wavelengths spanning the visible/near infrared detection range, when broadened by a joined repetition rate with the medium of 3 kHz, are each operating at 1 kHz, all separated by ⅓ of a millisecond from one another, then the medium may experience stimulation/excitation at a rate as high as 3 kHz, presuming that each of the pulses from the three different lasers stimulates the medium (e.g. in the form of ionizing the medium and depositing energy into it to heat the gas and open up a rarefied region). In this case, the benefit of the interactions may mirror those of the repetition rate up to the combined repetition rate of 3 kHz, although each individual laser is only repeating at 1 kHz. This effect on the laser pulses from each of the three distinct lasers may or may not be identical to that of operating each at their combined repetition rate seen by the medium, and depends on how similar the effect on the medium is from each of the different types of pulses when operating in this configuration of successive pulses.

The more similar the effect is on the medium by the different types of pulses, the more closely the effect of the entire interaction on the individual pulses may mimic that of each given type of pulse operating at the combined repetition rate. If the sampling rate of the sensor and/or imaging array is less than the individual repetition rates (e.g. less than 1 kHz in this example), then the effect on the sensor and/or imaging array would be to effectively see a continuous representation of the three broadened wavelengths, without any temporal interruption. For example, if the interaction of pulses with central wavelengths of 660 nm, 800 nm, 1065 nm, and 1550 nm, are generated as pulse trains at 1 kHz each, each offset from the preceding train by 0.25 milliseconds, are all depositing equal amounts of energy into the air (as the medium) along comparable lengths, the air may then be interacting mechanically with the combined train, similarly to if the air were being stimulated/excited by the combination of all four of the lasers individually, operating at a repetition rate of 4 kHz. As a result, the electromagnetic emission spectra of each of the laser pulses may be broadened similarly to if it were being operated at 4 kHz, although each laser is operating only at 1 kHz (with the air/medium being excited at the combined repetition rate of 4 kHz). In this example, the four lasers, operating at relatively modest repetition rates may notionally generate a broad spectrum to fully saturate the range from roughly 350-2000 nm or 450-1800 nm.

The precise details depend on how the parameters are tuned in this system and how they interact with one another under the precise conditions in the medium, but the example serves to demonstrate that the repetition rate seen by the medium is the governing repetition rate for the laser-medium interactions, since the medium relaxes after a given pulse according to its characteristic timescale. When combining pulses from different lasers, the actual repetition rate experienced by the medium may also be that of a given laser, if the laser pulse interactions of the different lasers (operating at the same repetition rate) with the medium overlap in time. Similarly, the actual repetition rate experienced by the medium may be higher, if the interactions of the medium and pulses from the individual lasers (operating at the same repetition rate) are uniformly offset in time. If the pulses are not spaced evenly in time, or if the individual laser repetition rates are not the same, it may not be possible to characterize the interaction between laser pulses and medium by citing a repetition rate. It is also not necessary that a given laser have a uniform repetition rate. As a result, the interactions may not be regularly spaced, but this case is also disclosed herein, as we are describing the interactions of a plurality of pulses, not necessarily at a regular or easily-characterized repetition rate. In fact, we disclose here arbitrary spacing in time. One example of irregular spacing in time is that of pulse-bursts, in which a given laser is operating at a regular repetition rate, but each of the pulses is broken into multiple sub-pulses. As an example, one may have a laser operating at 3 kHz, with each of these pulses broken into some number of sub-pulses that are separated by multiples of 11 ns, as an example. This situation does not lend itself to characterization using a single repetition rate, but it, too, is disclosed herein. This particular combination allows laser-medium interaction at both the electronic and mechanical timescales, for example allowing longer and more conductive filaments with broadened emissions spectra, which are also able to generate microwave pulses or THz pulses, as well as sustain the plasma for longer, thereby lengthening the filaments yet further.

The disclosed technique may thus be implemented to control spectral broadening and reshaping of ultrashort laser pulses undergoing filamentation in media by varying the timing between the plurality of laser pulses, including changing regular separation in time of pulses by changing the repetition rate of the laser. In particular for the medium of air, the repetition rate may range from 50 Hz-50 kHz and 100 Hz-10 kHz, among other ranges, employing pulse energies of 0.1 mJ-100 mJ, and 0.2 mJ-2 J among other ranges, generating broadband light over sub-ranges of wavelengths within the overarching range of 200 nm-15,000 nm, depending on the central wavelength of the initial laser pulse, the pulse parameters, repetition rate (in the case of regularly spaced pulses), and atmospheric conditions. The spectral range(s) may be much narrower around a given central wavelength (e.g. spanning several hundred or several thousand nm), however instead of having to optimize the system to generate the full range of wavelengths from a single central wavelength, multiple laser pulses with different central wavelengths may also be considered, in order to more easily achieve a much broader range than may be achieved by using only a single central wavelength. One application is that the broad spectrum may be tailored by adjusting the repetition rate, in order to obscure a specific signature from an observer/sensor/detector/imaging-array that is illuminated by the generated broad spectrum. The broad spectrum may also be tailored to saturate a given detection range and/or functional detection range, e.g. of said observer/sensor/detector/imaging-array. Example sub-ranges include but are not limited to 220 nm-1200 nm, and/or 200-2000 nm, and/or 300-900 nm, and/or 3,000-5,000 nm, and/or 2,000-5,000 nm, 600-6,000 nm and/or 8,000-12,000 nm, among others, including combinations thereof. The pulse spatial and temporal reshaping may also for example be tailored through control of the repetition rate (in the case of regularly spaced pulses) to achieve a desired effect on said observer/sensor/detector/imaging-array such as obscuration of one or more functional detection ranges and/or temporary or permanent incapacitation.

Using the disclosed techniques, control and generation of a coherent supercontinuum in media may also be achieved by varying the timing between the plurality of laser pulses, including regular spacing and varying the repetition rate of the laser. In particular for the medium of air, the repetition rate may range from 50 Hz-50 kHz and 100 Hz-10 kHz, among other ranges, employing pulse energies of 0.1 mJ-100 mJ and 0.2 mJ-2 J, among other ranges, generating broadband light over sub-ranges of wavelengths within the overarching range of 200 nm-15,000 nm, depending on the central wavelength(s) of the initial laser pulse(s), their pulse parameters (including repetition rate for regularly spaced pulses), and atmospheric conditions. The spectral range(s) may be much narrower around a given central wavelength (e.g. spanning several hundred or several thousand nm), however instead of having to optimize the system to generate the full range of wavelengths from a single central wavelength, multiple laser pulses with different central wavelengths may also be considered, in order to more easily achieve a much broader range than may be achieved by using only a single central wavelength. One application is that the coherent continuum may be tailored by adjusting the repetition rate, in order to obscure a specific signature from an observer/sensor/detector/imaging-array that is illuminated by the generated coherent continuum. The coherent continuum may also be tailored to saturate a given detection range, e.g. of said observer/sensor/detector/imaging-array. Example sub-ranges include but are not limited to 220 nm-1200 nm, and/or 200 nm-2000 nm, and/or 300-900 nm, and/or 3,000-5,000 nm, and/or 2,000-5,000 nm, and/or 600-6000 nm and/or 8,000-12,000 nm, among others.

Another area of application disclosed herein is to adjust the parameters of a plurality of laser pulses to control the length of a laser filament and a laser-produced plasma in media by varying the spacing in time of pulses, including the repetition rate of a laser. In particular for the medium of air, the repetition rate can range from 50 Hz-50 kHz, 800 Hz-3 kHz, 1 kHz-6 kHz, 100 Hz-10 kHz, 0.1 Hz-2 kHz, and/or 1 kHz-30 kHz, among other ranges, employing pulse energies of including but not limited to 0.1 mJ-100 mJ, 0.01 mJ-10 mJ, and 0.2 mJ-2 J, among other ranges. These repetition rates govern successive pulses, which can be in the form of individual pulses, individual pulses within pulse bursts, and/or pulse-bursts, and these pulse bursts can then be repeated at slower repetition rates, to tailor the laser system's average power. The individual energies listed here and below are also those for each individual pulse (whether an initiating pulse or sustaining pulse, if this type of modulation is being employed), with the energy modulation within the pulse burst and the number of pulses within each pulse burst being tailored to accommodate system energy and power concerns, while the individual pulse-burst profiles are tailored to optimize the desired effect. Included in our disclosure of arbitrary pulse timing, is the propagation of differently polarized laser pulses in closely-spaced succession (as a type of pulse-burst), superimposed upon the repetition rates listed above, including combinations of linear polarization states ranging from 0-180 degrees of relative polarization, as well as partially and fully circularly polarized light in both directions. This succession is not limited to only two pulses of different polarization, but may be up to 100 pulses of different polarization states in rapid succession, following one another in the range of 1 femtosecond-10 picoseconds. Another type of pulse that may be added is a longer ultraviolet laser pulse, ranging from 100 picoseconds in length to 100 ns in length, with pulse energies ranging from 10 mJ to 300 Joules. For condensed media (liquid/solid), much lower pulse energies (including but not limited to the range 20 nJ-2 mJ), and higher repetition rates (including but not limited to 50 kHz-500 MHz, 10 kHz-100 MHz, and 1 MHz-3 GHz, among other ranges) may produce effects of interest. This application in condensed media may produce filaments, materials effects/processes described herein, and new frequencies and broadened spectral ranges of the resulting electromagnetic emissions, among other effects described herein.

The flexibility in varying the laser pulses includes pulse energy and separation (including repetition rate if the pulses are regularly spaced), as well as modulation of the other pulse parameters described/disclosed herein, including but not limited to pulse width, pulse separation, wavelength, polarization, superposition of pulses with different parameters, including but not limited to wavelength/harmonics, polarization and radiation direction/orientation, among others. Superposition of some of these parameters are constrained by additional considerations, such as control phase-matching conditions in given media. This is of particular importance in crystalline media. Superposition of different directions of laser radiation may also be instrumental in generating new wavelengths, both in air and in condensed media, and varying the temporal spacing (or repetition rate for regularly spaced pulses) of the pulses is key in the generation of few-cycle pulses using filamentation in air and condensed media, among other pulse parameters disclosed herein.

Control and extension of electrical discharge, triggered and guided by multiple laser pulses, may also be achieved by varying the parameters, such as timing (including repetition rate) of the laser pulses. In particular for the medium of air, the repetition rate may range from 50 Hz-100 kHz and 100 Hz-10 kHz, among other ranges, depending in large part on the relative speed of the medium, if the medium is moving with respect to the laser platform, employing pulse energies of 0.1 mJ-100 mJ, 0.2 mJ-2 J, and more narrowly 2 mJ-50 mJ among other ranges. When the medium is moving with respect to the laser platform, the laser repetition rate and filament/focus implementation must be adjusted to ensure that the medium encountered by each successive pulse is in the desired state as affected by a preceding pulse or set of pulses, to achieve the effect for which the repetition rate is being controlled. In at least one embodiment of the invention it may be that the relevant repetition rate is that experienced in a specific location in the reference frame of the medium being affected, which may differ from the repetition rate at the laser when adjusted for the relative motion among the medium, platform, target, and or focusing/ionization/filamentation/ablation dynamics. To achieve the desired/disclosed repetition rate in the reference frame of a moving medium, the actual laser repetition rate may be adjusted, e.g. increased, in order to affect the medium sufficiently quickly as it moves with respect to the laser-interaction region. One may also move the laser interaction region by directing the laser pulses and adjusting the focusing optics to allow the laser-interaction region to move with the medium, so that there is no relative motion between the medium and the laser-interaction region. This approach is inappropriate if the laser-interaction region must move to track a target platform (such as one containing sensors, detectors, and/or imaging arrays) that is moving with respect to the medium, or if the laser-interaction region must move to track the host platform, housing the laser (such as one whose drag is to be reduced, among other applications). In these cases, the lasers must operate with shorter pulse separation times (or at higher repetition rates for pulses with constant pulse separation), in order to excite the medium at the repetition rates disclosed herein. To better position the laser pulses, effects, and/or filaments, adaptive optics and motorized focusing elements may also be employed, although not necessarily, which further helps accommodate practical considerations involved in non-ideal and/or moving media and/or target/interaction sites.

When applying the above applications in denser plasmas, including but not limited to those occurring in condensed media, the characteristic relaxation times are shorter, and for regularly space pulses, the repetition rate may be increased into higher ranges, including but not limited to those of 1 MHz-1 GHz, 100 MHz-3 GHz, 900 MHz-11 Ghz, and 1-100 GHz. These ranges and their corresponding time-scales are also applicable when tuning the repetition rate to control other processes/effects, which depend on ionization in a condensed medium or effectively at its surface, including but not limited to writing or polymerizing structures and/or cleaning and/or peening among other applications. For X-ray generation, extremely short relaxation/recombination times may be operative, including 1-100 fs, 0.1-10 fs, and 10 fs-10 ps, many of which lend themselves well to using the compressed sub-femtosecond pulses that may be generated using the disclosed techniques, which may be concatenated into intensity-modulated pulse-bursts through interferometric techniques. Without limiting other methods of implementation, this would allow ultrashort pulses to enter a system at a given repetition rate, and become compressed and/or concatenated to optimize the X-rays that may be generated by the pulse. Interferometric techniques involve physical optics and may be used to create pulse trains of extremely short pulses, which may then be amplified further. The generation and amplification techniques must be tailored together to accurately tune the resulting pulse trains and/or pulse-bursts. These timescales and frequency ranges may also be employed in generating THz radiation, depending on the method of generation.

The general laser techniques described herein may additionally be used in the following applications: to saturate an optical sensor and/or imaging array; lidar and/or ladar; environmental monitoring; remote sensing; wavefront control in imaging and adaptive optics; saturating sensors and/or arrays; overwhelming certain spectral bands in order to obscure certain signatures of interest; laser pulse compression; guiding microwaves; guiding lightning; guiding electric discharges; THz generation; X-ray generation; aerodynamic flow-control; drag reduction; writing waveguides in materials; cleaning surfaces; peening surfaces; introducing stresses to surfaces; chemically treating surfaces; marking surfaces; polymerizing paths in unpolymerized fluid media; writing three dimensional structures in materials through processes including but not limited to ablation, stress introduction, chemical modification, and phase change.

EXAMPLES

To generate a laser filament with a single pulse, it is generally considered/acknowledged that the laser pulse has to exceed the critical power for self-focusing. In air at standard temperature and pressure, the critical power is roughly 3 GW at a wavelength of 800 nm. Above this threshold, the laser pulse undergoes self-focusing. In air, gases, liquids or other bulk media, free electrons and ions may be generated, for example due to photoionization. The free electron plasma serves to counter-balance the self-focusing of the initial beam. Through a dynamic balance among various effects, including but not limited to diffraction, self-focusing, plasma defocusing, and/or any other linear/nonlinear mechanisms/ losses, a self-guided waveguide, or a filament, may be created by the intense laser pulse. This filament may propagate over many Rayleigh lengths, maintaining its characteristically small beam size. This highly nonlinear phenomenon has been observed in solids, liquids, and gases, including in air. In an embodiment of the invention, the methods described to control this interaction between the laser pulse and its propagation medium and the resulting effects/signatures, may include but are not limited to controlling the generation of broadband pulses of THz, infrared, near infrared, and microwave radiation, and controlling the spectral bandwidth and length of laser filaments and/or guided electric discharges, pertains to generation of broadband pulses and generation of filaments in all media, including, but not limited to air, liquids, gases and solids. An example of at least one embodiment of the invention is given below in relation to the generation of filaments in air.

Example 1

The generation of laser filaments in air is achieved with a sub-30 fs chirped-pulse amplifier titanium:sapphire laser system. This laser produces 3 mJ pulses at a central wavelength of 800 nm with a variable repetition rate up to 3 kHz. The repetition rate of the laser may be varied by a combination of adjusting the repetition rate of the pump laser and an electro-optic switch. For the experimental results shown in FIG. 1, the pump laser repetition rate is set to 2 kHz and the output of the laser is chopped with an electro-optic switch so that the repetition rate is varied. To generate laser filaments in air, a beam expander consisting of two lenses is used. By varying the position of lens L1, different focusing conditions may be achieved to generate plasmas ranging from a strongly focused laser plasma to a filament through weak focusing. The results shown below are taken with a weak focusing geometry with the beam expander having an effective focal length of f=3.8 meters to generate filaments, as shown in FIG. 1. The spectrum of the emission of the filament is recorded after hitting a diffuser, located at a distance of 4.75 m from the beam expander, with a USB spectrometer having a wavelength range of 200-1100 nm.

Figure 2:
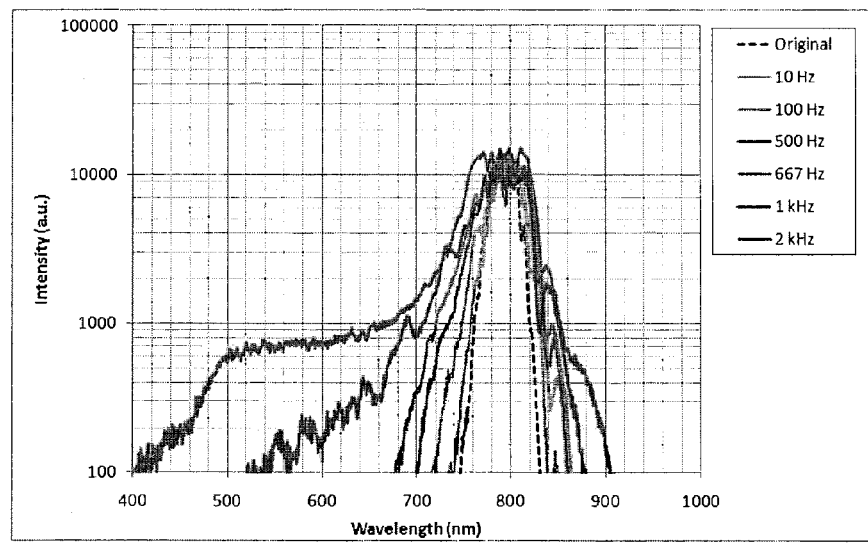
FIG. 2 shows the spectral broadening due to increasing repetition rate of the laser.

FIG. 2 shows the filament spectra at different repetition rates of the femtosecond laser while maintaining the pulse energy, initial pulse chirp and focusing geometry. The spectrum of the original pulse before filamentation is shown by the dashed black line. Above 1 kHz repetition rate, the spectrum becomes much broader.

Centered around the center frequency of roughly 800 nm, we generate a broad spectrum of forward-scattered light (in addition to scattering in other directions, including backward-scattering). This broad forward- and backward-scattered light may be used as an active source for remote sensing applications. The broad forward-scattered light may furthermore be used to saturate a sensor/detector and/or array over the range of wavelengths generated, as well as temporarily or permanently incapacitate the sensor/detector and/or imaging array. Regardless of the sensor or array and how easily it is saturated, this broad range of wavelengths may also be used to obscure signatures of interest within that range of wavelengths (as a side note, this broad range of wavelengths may also be used to probe and illuminate targets of interest, for example but not limited to remote sensing applications). As further example, signatures that could be received at a specific detector/sensor and/or imaging array, after being emanated from a platform that houses the filamenting laser, could be obscured by directing the filamenting laser toward said detector/sensor and/or array, with the filament being formed before the laser pulse reaches the detector/sensor and/or imaging array. This ensures that the detector may receive the strong diverging cone of spectrally-broad light, thereby obscuring any weaker signature in that same broad band coming from the rest of the platform. Nothing in our application limits the central wavelength of the laser pulse, thereby allowing us to employ central laser wavelengths and pulse repetition rates that may generate broad spectra over the spectral regime of signatures we would like to obscure and/or over the spectral regimes over which we would like to saturate said sensor/ detector and/or imaging array. For example, using a central laser wavelength on the order of 2 μm may generate a broad spectrum from 2.3 μm to 1.1 μm, depending on the laser pulse width and pulse repetition rate. Nothing precludes us from incorporating more than one laser wavelength and/or more than one laser, so that adding a laser with central wavelength at approximately 1 μm may allow us to extend the range of saturation and/or obscuration down to roughly 600 nm, again depending on the central wavelengths and repetition rates of the two laser systems. Nothing limits the number of lasers we employ, their central wavelengths, or the repetition rates at which we apply them, and as a result at least one embodiment of the invention may couple 3 laser systems to cover yet greater spectral ranges (e.g. from 5 μm to 400 nm), or may alter the pulse width and repetition rates of said lasers to for example couple 2 μm and 800 nm central wavelengths to cover the spectrum from 2.2 μm to 450 nm. The generated wavelength ranges may also be tailored, instead of to a spectral range to be obscured, or a contiguous range of wavelengths, to specifically generate the wavelengths measured by a specific detector/sensor and/or imaging array. The initial pulses may also be mixed with their own harmonics, in order to generate broadband THz, microwave, near infrared and infrared pulses, which may be used for communication, additional sensing, as sources for active imaging, and/or to interrupt/obscure detection, imaging, and/or communication at the generated frequencies.

Example 2

Figure 3:
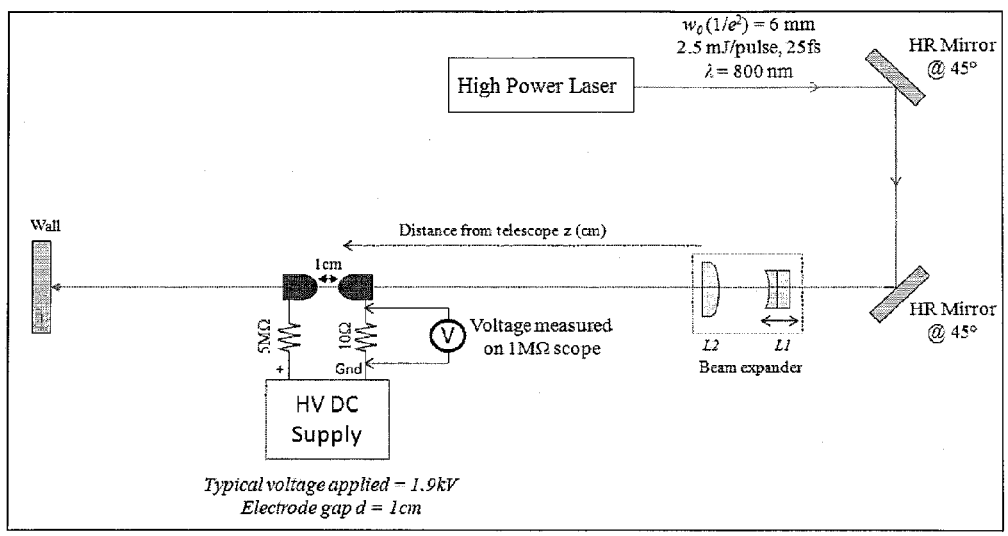
FIG. 3 shows the experimental setup to measure the relative electrical conductivity and length of a laser filament.

Since free electrons are generated within the laser filament, the length of the filament may also be characterized by recording the relative conductivity along the propagation of the laser pulse as shown in FIG. 3. Generating filaments, using laser/system parameters comparable to those used and described in Example 1, the free electrons induce an electric current flowing through a resistive load when an external electric field is applied onto a pair of electrodes. These electrodes, with a hole at the center to allow the laser beam to pass through without any ablation, are separated by 1 cm and a constant voltage of 1.9 kV is applied for all conductivity measurements. The pair of electrodes is translated along the propagation direction of the laser. Measuring the induced voltage across the resistor gives a relative conductivity of the laser filament and/or laser-induced conductive channel, to yield the electrical length of the filament and/or laser-induced conductive channel.

Figure 4:
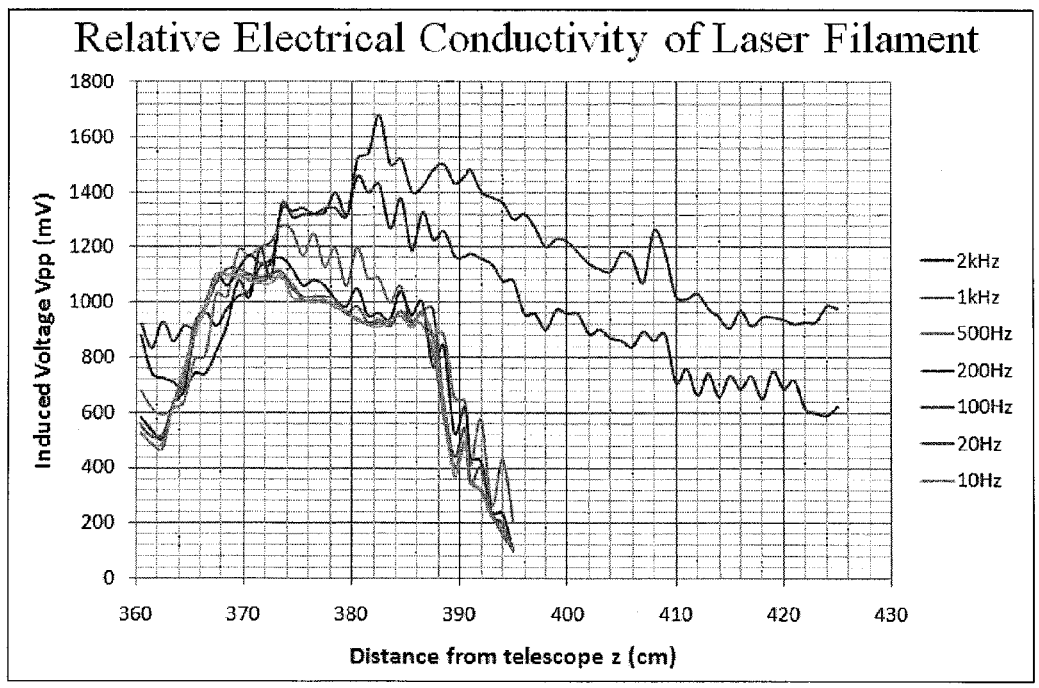
FIG. 4 shows the dependence of filament/laser-induced conductive channel length on the repetition rate of the laser.

Again, by increasing the repetition rate of the laser above 1 kHz, the length and electrical conductivity of a laser filament/plasma is increased, as seen in FIG. 4. The x-axis of FIG. 4 shows distance as measured from the beam expander with the beam expander having an effective focal length of f=3.8 m. Relative conductivity measurements were not able to be performed beyond a distance of z≥4.25 m due to space restrictions in the laboratory.

Each and every publication and patent application mentioned in this specification are herein incorporated by reference in their entirety (to the same extent as if each individual publication or patent application was specifically and individually indicated to be incorporated by reference).

What is claimed is:

1. A method for controlling the effects generated by the interaction of a plurality of laser pulses with a medium by selecting or varying the successive pulse parameters comprising: generating a plurality of laser pulses interacting with a medium; and selecting or varying the properties/parameters characterizing said laser pulses to control the effects resulting from the interaction among said plurality of laser pulses and said medium
wherein the effect being controlled is the spectral content of the electromagnetic emissions generated by said plurality of laser pulses interacting with said medium and said effect is that of broadening the spectrum of electromagnetic emissions, beyond those resulting from the interaction between the medium and a single laser pulse and said broadened electromagnetic emission spectrum is directed toward a sensor and/or imaging array in order to saturate it over a range of wavelengths to obscure signatures of interest or temporarily or permanently disable said sensor and/or imaging array.

2. The method of claim 1, wherein said electromagnetic emissions include THz radiation.

3. The method of claim 1, wherein said medium is air.

4. The method of claim 1, wherein said medium is condensed matter.

5. The method of claim 1, wherein said electromagnetic emissions include Xray radiation.

6. The method of claim 5, wherein said medium is a gas.

7. The method of claim 6, wherein said medium is condensed matter.

8. The method of claim 1, wherein said electromagnetic emissions are in the wavelength range 200 nm-15,000 nm.

9. The method of claim 1, wherein the timing of the laser pulses is adjusted to regular spacing in time to include repetition rates within the range of 100 Hz-10 kHz.

10. The method of claim 9, wherein the energy of the successive pulses is selected or adjusted within the range of 0.1 mJ-100 mJ.

11. The method of claim 1, wherein said plurality of pulses are generated by one or more lasers with differing central wavelengths, such that the sum/span of their broadened spectra covers a functional detection range of the target sensor and/or imaging array.

12. The method of claim 1, wherein the plurality of pulses includes in addition to successive pulses, simultaneously occurring pulses, which are characterized by distinct parameters from one another.

13. The method of claim 1, wherein said electromagnetic emissions are in the wavelength range 200 nm-1200 nm.

14. The method of claim 1, wherein the timing of the laser pulses is within the range of 50 Hz-50 kHz.

15. The method of claim 14, wherein the energy of the successive pulses is within the range of 0.2 mJ-2 J.

16. The method of claim 1, wherein said electromagnetic emissions are in the wavelength range 600 nm-6000 nm.

17. The method of claim 16, wherein the timing of the laser pulses is within the range of 50 Hz-50 kHz.

18. The method of claim 17, wherein the energy of the successive pulses is within the range of 0.2 mJ-2 J.

19. The method of claim 1, wherein the parameters are varied and characterize the laser pulses to include regular pulse spacing and selection of repetition rates in the range of 100 Hz-10 kHz and pulse energies in the range of 0.1-100 mJ.

20. The method of claim 1, wherein the parameters are varied and characterize the laser pulses to include regular pulse spacing and selection of repetition rates in the range of 50 Hz-50 kHz and pulse energies in the range of 0.2 mJ-2 J.

21. The method of claim 1, wherein a length, spatially and temporally, of an ionized region of the medium comprising a filament is increased by adjusting the parameters characterizing the plurality of laser pulses.

22. The method of claim 21, wherein the parameters which are varied and which characterize the pulses, include the timing between pulses, to include regular pulse spacing and selection of repetition rates in the range of 100 Hz-10 kHz and pulse energies in the range of 0.1-100 mJ.

23. The method of claim 22, wherein polarization of the pulses is also controlled, with the pulses of different polarization following one another in succession over a range of 1 fs-10 ps.

* * * * *